United States Patent
Jalluri et al.

(10) Patent No.: US 7,571,022 B2
(45) Date of Patent: Aug. 4, 2009

(54) SYSTEM AND METHOD FOR MONITORING MACHINE HEALTH

(75) Inventors: Chandra Jalluri, Canton, MI (US); Prashanth Magadi, Ypsilanti, MI (US); Ingrid Kaufman, Eden Prairie, MN (US)

(73) Assignee: Ford Motor Company, Dearborn, MI (US)

( * ) Notice: Subject to any disclaimer, the term of this patent is extended or adjusted under 35 U.S.C. 154(b) by 341 days.

(21) Appl. No.: 11/161,417

(22) Filed: Aug. 2, 2005

(65) Prior Publication Data
US 2006/0089742 A1    Apr. 27, 2006

Related U.S. Application Data

(63) Continuation-in-part of application No. 10/904,119, filed on Oct. 25, 2004, now Pat. No. 7,409,261.

(51) Int. Cl.
*G06F 19/00* (2006.01)

(52) U.S. Cl. .............. 700/160; 700/159; 700/174; 700/177; 702/179

(58) Field of Classification Search .......... 700/159, 700/174, 176, 175, 177, 179, 188; 702/179
See application file for complete search history.

(56) References Cited

U.S. PATENT DOCUMENTS

| | | | |
|---|---|---|---|
| 4,723,219 A | 2/1988 | Beyer et al. | |
| 4,816,731 A | 3/1989 | Boulton et al. | |
| 4,985,857 A | 1/1991 | Bajpai et al. | |
| 5,119,318 A | 6/1992 | Paradies et al. | |
| 5,127,005 A | 6/1992 | Oda et al. | |
| 5,181,898 A | 1/1993 | Piotrowski | |
| 5,339,257 A | 8/1994 | Layden et al. | |
| 5,407,265 A | 4/1995 | Hamidieh et al. | |
| 5,663,894 A * | 9/1997 | Seth et al. | 702/56 |
| 5,672,230 A | 9/1997 | Park et al. | |
| 5,719,479 A | 2/1998 | Kato et al. | |
| 5,857,166 A | 1/1999 | Kim | |
| 5,896,292 A | 4/1999 | Hosaka et al. | |
| 5,937,405 A | 8/1999 | Campbell | |
| 6,161,051 A | 12/2000 | Hafemann et al. | |
| 6,217,496 B1 | 4/2001 | Lindem | |
| 6,240,451 B1 | 5/2001 | Campbell et al. | |
| 6,289,735 B1 | 9/2001 | Dister et al. | |
| 6,324,659 B1 | 11/2001 | Pierro | |
| 6,338,003 B1 | 1/2002 | Kamiguchi et al. | |
| 6,442,444 B2 | 8/2002 | Matsubara et al. | |
| 6,470,377 B1 | 10/2002 | Sevcik et al. | |

(Continued)

*Primary Examiner*—Kidest Bahta
*Assistant Examiner*—Nathan Laughlin
(74) *Attorney, Agent, or Firm*—Raymond Coppiellie; Brooks Kushman P.C.

(57) ABSTRACT

A method for monitoring health of a machine tool includes operating the machine tool outside an operation cycle to effect movement of a portion of the machine tool. Data from signals output from a sensor and from a controller attached to the machine tool are used to define at least one movement-specific data profile for the movement of the portion of the machine tool. An algorithm is then applied to at least a portion of the at least one movement-specific data profile to generate at least one movement-specific data point. This facilitates generation of at least one movement-specific trend line, which can be used to analysis the health of the machine tool.

4 Claims, 6 Drawing Sheets

U.S. PATENT DOCUMENTS

| | | |
|---|---|---|
| 6,484,109 B1 | 11/2002 | Lofall |
| 6,496,789 B2 | 12/2002 | Seth et al. |
| 6,587,744 B1 | 7/2003 | Stoddard et al. |
| 6,615,103 B2 | 9/2003 | Fujishima et al. |
| 6,643,592 B1 | 11/2003 | Loman et al. |
| 6,697,894 B1 | 2/2004 | Mitchell et al. |
| 6,731,995 B2 | 5/2004 | Takeuchi |
| 6,732,056 B2 * | 5/2004 | Kluft et al. .................... 702/39 |
| 6,738,748 B2 | 5/2004 | Wetzer |
| 6,741,265 B2 | 5/2004 | Ghosh et al. |
| 6,845,340 B2 | 1/2005 | Edie et al. |
| 6,882,961 B2 | 4/2005 | Cobble et al. |
| 6,909,990 B2 | 6/2005 | Okazaki et al. |
| 6,947,797 B2 | 9/2005 | Dean et al. |
| 6,954,680 B2 | 10/2005 | Kreidler et al. |
| 7,054,761 B2 | 5/2006 | Lindberg et al. |
| 7,168,351 B2 | 1/2007 | Hirayama et al. |
| 7,200,774 B2 | 4/2007 | Vollmar et al. |
| 2001/0049325 A1 * | 12/2001 | Katoh et al. .................. 483/30 |
| 2002/0010991 A1 * | 1/2002 | Muscarella et al. ......... 29/38 B |
| 2002/0017139 A1 | 2/2002 | Kluft et al. |
| 2002/0129653 A1 | 9/2002 | Seth et al. |
| 2002/0138171 A1 * | 9/2002 | Fukutani .................... 700/188 |
| 2002/0198686 A1 | 12/2002 | Hu et al. |
| 2003/0046436 A1 | 3/2003 | Govindaraj et al. |
| 2003/0103827 A1 | 6/2003 | Moller et al. |
| 2003/0212766 A1 | 11/2003 | Giles et al. |
| 2004/0176926 A1 * | 9/2004 | Edie et al. ................... 702/179 |
| 2004/0193307 A1 | 9/2004 | Fujishima et al. |
| 2005/0097405 A1 | 5/2005 | Sesek et al. |
| 2005/0160847 A1 * | 7/2005 | Walter ....................... 74/89.37 |
| 2005/0218192 A1 | 10/2005 | Lovin et al. |
| 2005/0262236 A1 | 11/2005 | Schachtely et al. |
| 2006/0089743 A1 | 4/2006 | Jalluri et al. |
| 2006/0089744 A1 * | 4/2006 | Jalluri et al. ................ 700/174 |
| 2007/0067678 A1 | 3/2007 | Hosek et al. |

\* cited by examiner

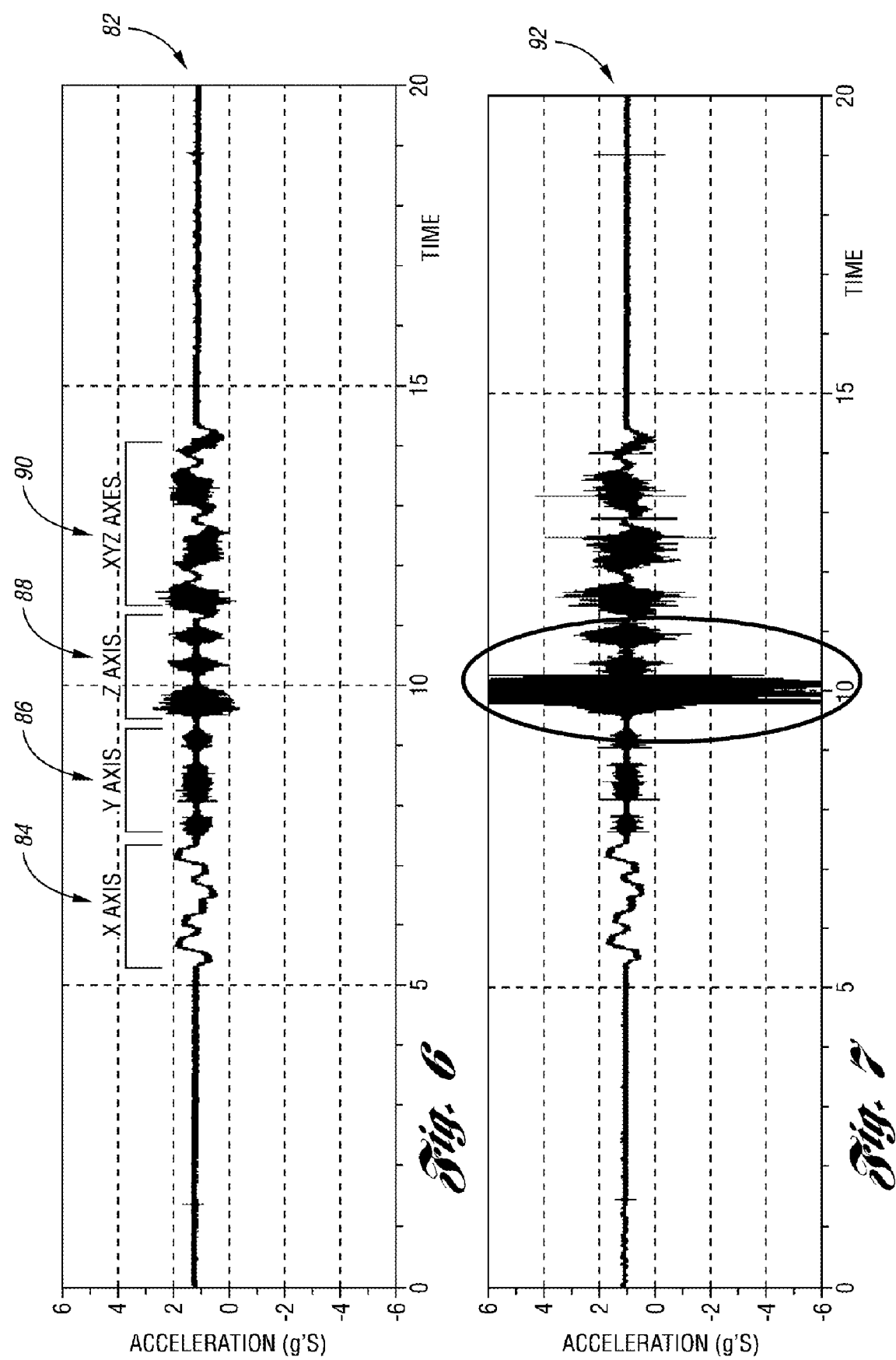

SYSTEM AND METHOD FOR MONITORING MACHINE HEALTH

CROSS-REFERENCE TO RELATED APPLICATIONS

This application is a continuation-in-part of U.S. application Ser. No. 10/904,119 filed Oct. 25, 2004, now U.S. Pat. No. 7,409,261, which is hereby incorporated herein by reference.

BACKGROUND OF THE INVENTION

1. Field of the Invention

The present invention relates to a system and method for monitoring machine tool health.

2. Background Art

The ever-increasing emphasis on product quality continues to put pressure on manufacturers to find new ways to produce high quality products without increasing production time or otherwise increasing manufacturing costs. Inherent in this high quality, low cost dichotomy is a need to reduce scrap, while obtaining the longest possible life from manufacturing tools and equipment. Thus, increasing the number of tooling changes and/or decreasing the time between machine tool maintenance may increase product quality, but it may result in an unnecessary increase in tooling costs and/or lost production time.

Over time, manufacturers have developed systems and methods of predictive and preventative maintenance. Such systems may include a scheduled tool change based on a number of parts produced, or scheduled machine down time, during which bearings and other components may be replaced prior to their having an adverse effect on product quality. In order to implement these systems in a cost effective manner, or to reduce the frequency of these preventative maintenance tasks, decision-makers need information. In particular, information that is indicative of historical trends is useful, so that accurate predictions can be made regarding future production runs. In addition, the ability to isolate particular problem areas is also useful; this helps to concentrate efforts where they will have the most impact and produce the most benefit.

Toward this end, manufacturers have continued to analyze machine tools and their associated components in an effort to gather information they can use to make efficacious decisions regarding their production systems and processes. One type of machine tool analysis used is a vibration analysis. Information gathered from this type of analysis may be indicative of a variety of different production problems.

One system and method of characterizing a machining process using vibrational signatures of machines is described in U.S. Pat. No. 5,663,894, issued to Seth et al. on Sep. 2, 1997. Seth et al. describes characterizing the vibrational signatures of machines by discriminating vibrational activity at various positions on the machines. This is done both with and without machining loads. Both time and frequency domain analysis may then be stored in a database for future comparison and tracking.

Because a machine tool, during non-machining operations, may see vibrations which are many times higher than those seen during a cutting operation, it may be desirable to isolate non-machining data for separate evaluation from the machining data. Moreover, it may be desirable to operate the machine tool outside an operation cycle, for purposes of collecting non-machining data. This data could then be used as an indicator of the health of the machine tool itself, rather than indicating the health of a particular machining process.

SUMMARY OF THE INVENTION

One advantage of the present invention is that it provides a system and method for monitoring machine tool health that uses non-machining data from specifically designated machine tool movements, thereby providing an indicator of the health of the machine tool.

The invention can also automatically issue warnings and/or alarms to plant floor personnel. These warnings and/or alarms can provide indicators of the health of the machine, not limited to a machine spindle. This provides advantages over conventional systems which involve off-line analysis only, and those systems which apply only to the spindle.

The invention also provides a method for monitoring health of a machine tool operable to perform at least one operation cycle including at least one machining operation on a workpiece. The machine tool includes a spindle configured to hold a cutting tool, and a first slide operable to effect a linear movement of a portion of the machine tool. The machine tool has at least one sensor operatively connected thereto for sensing a machine operation parameter, and a controller configured to output data related to operation of the machine tool. The method includes operating the machine tool outside an operation cycle to effect movement of a portion of the machine tool. Data from signals output from the at least one sensor and from the controller are processed to define at least one movement-specific data profile for the movement of the portion of the machine tool. An algorithm is applied to at least a portion of the at least one movement-specific data profile to generate at least one movement-specific data point, which facilitates generation of at least one movement-specific trend line.

The invention further provides a method for monitoring health of a machine tool that is operable to perform at least one operation cycle including at least one machining operation on a workpiece. The machine tool includes a spindle which is configured to hold a cutting tool. The machine tool also includes a first slide which is operable to effect a linear movement of a portion of the machine tool. The machine tool has at least one sensor operatively connected thereto for sensing a machine operation parameter, and a controller configured to output data related to operation of the machine tool. The method includes sensing a machine operation parameter for the machine tool while the machine tool is operating outside an operation cycle. The operation of the machine tool includes movement of at least a portion of the machine tool. Data related to the sensed parameter is stored, and data from the sensor is associated with data from the controller, thereby defining at least one movement-specific data profile for the movement of the portion of the machine tool. An algorithm is applied to at least a portion of the at least one movement-specific data profile to generate at least one movement-specific data point. The at least one movement-specific data point is stored, thereby facilitating subsequent retrieval. Such data points can then be trended as a function of time. Another algorithm is applied to the data trends to generate machine health status, and issue warnings and alarms to avoid any catastrophic machine tool failures.

The invention also provides a system for monitoring health of a machine tool which is operable to perform at least one operation cycle including at least one machining operation on a workpiece. The machine tool includes a spindle configured to hold a cutting tool and a first slide operable to effect a linear movement of a portion of the machine tool. The system includes a sensor operatively connected to the machine for sensing a machine operation parameter, and for outputting signals related to the sensed parameter. A control system includes at least one controller, and is configured to control operation of the machine tool according to at least one predetermined program which effects movement of at least a portion of the machine tool outside an operation cycle. The control system is operatively connected to the machine tool, and is further configured to output signals related to operation of the machine tool. A processor is operatively associated with the sensor and the control system, and it is configured to associate data from the signals output from the sensor and from the control system to define movement-specific data profiles. The processor is further configured to apply an algorithm to at least some of the movement-specific data profiles to generate at least one movement-specific data point. A memory is operatively associated with the sensor, the control system, and the processor, and is configured to store information including the at least one movement-specific data point, thereby facilitating subsequent retrieval of the stored information. The control system and/or processor will also react based on controller signals to interface with plant personnel and provide warnings and alarms.

BRIEF DESCRIPTION OF THE DRAWINGS

FIG. 6 shows raw vibration data collected from a machine tool for movement of the machine tool slides; and FIG. 7 shows raw vibration data gathered from operation of the machine tool when there is a problem with the z-axis slide.

DETAILED DESCRIPTION OF THE PREFERRED EMBODIMENT(S)

Figure 1:
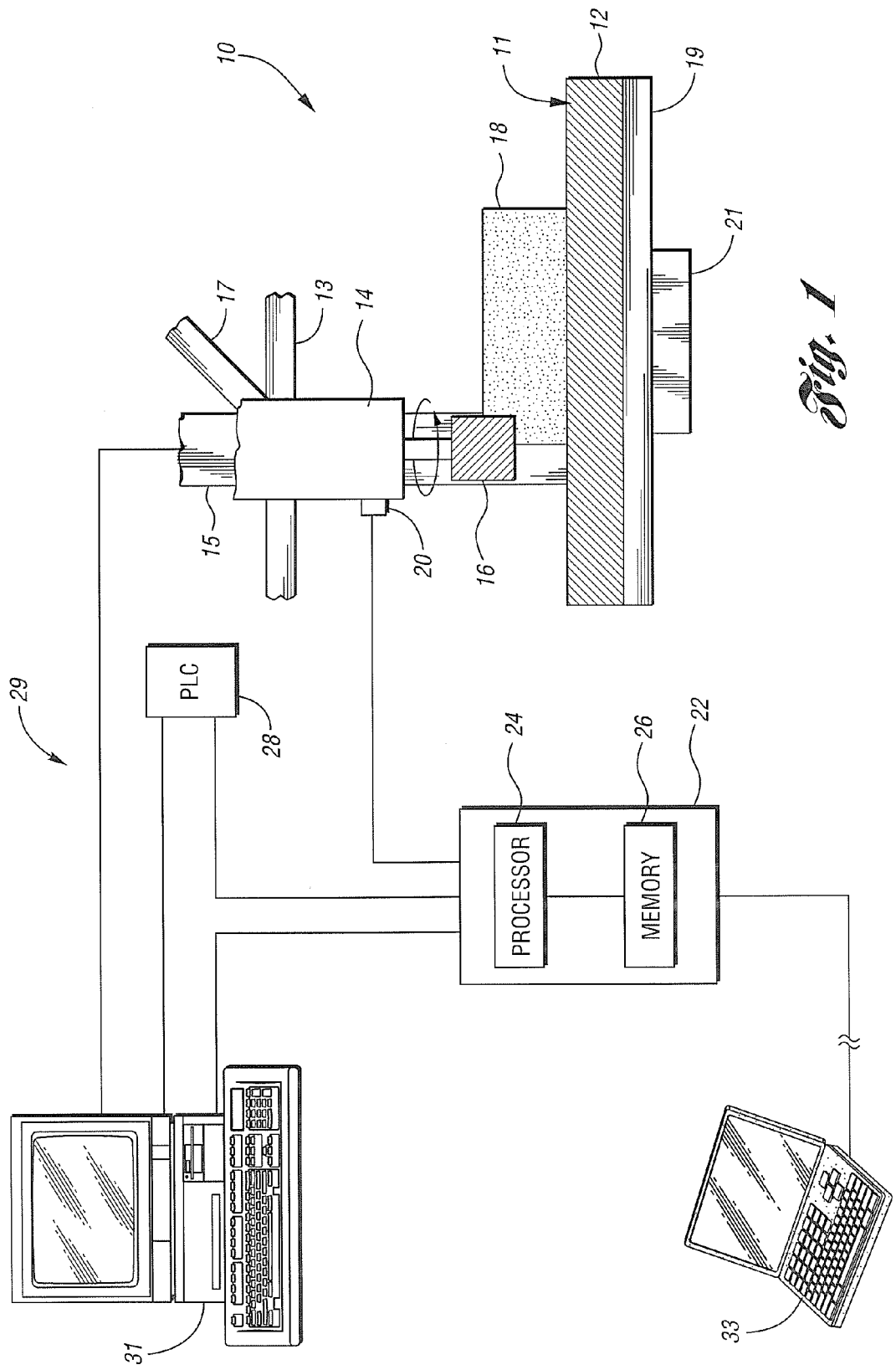
FIG. 1 is a schematic representation of a system for monitoring health of a machine tool in accordance with the present invention.

FIG. 1 illustrates a system 10 for monitoring the health of a machine tool 11. The machine tool 11 includes a bed 12 and a spindle 14. In addition, there are three slides 13, 15, 17, which are operable to effect a movement of the spindle 14 along an x-axis, a y-axis, and a z-axis, respectively. Of course, a machine tool may have slides for effecting movements of other portions of the machine tool; for example, slides 19, 21 facilitate movement of the bed 12 of the machine tool 11. The machine tool 11, shown in FIG. 1, is a computer numerical control (CNC) milling machine. As will readily be discerned from the description below, the present invention can be used with virtually any type of machine tool, including manual as well as CNC machines.

Mounted in the spindle 14 is a cutting tool 16 which is used to machine a workpiece 18. Attached to the spindle 14 is a vibration sensor 20 that is configured to sense vibrations in the spindle 14 and output signals related to the vibrations to a processing unit 22. The vibration sensor 20 may be chosen from any one of a number of types of vibration sensors, such as an accelerometer, a velocity sensor, or any other suitable sensor capable of sensing vibrations.

Of course, other types of sensors may be used—i.e., ones that sense machine operation parameters other than vibrations. For example, a current sensor may be used to measure changes in the amount of current the machine tool 11 draws during various operations. Similarly, a thermocouple, or other type of temperature sensor, could be used to detect changes in temperature of some portion of the machine tool 11. The spindle speed, torque, or feed rate could also be sensed to provide information relating to the operations. Indeed, any sensor capable of sensing a machine operation parameter can be used to send signals to the processing unit 22.

The processing unit 22 may be conveniently mounted directly on a portion of the machine tool 11, and includes a processor 24 and a memory 26. The processor 24 may be programmed to perform specific instruction sets on data, such as vibration data received from the sensor 20. A controller, such as a programmable logic controller, or PLC 28, is also attached to the machine tool 11, and may be programmed with information specific to the machine tool 11, or specific to a machining operation, non-machining operation, or operation cycle performed by the machine tool 11. The processor 24 and the memory 26 are both operatively connected to the sensor 20 and the PLC 28, such that data may be transferred among them.

The PLC 28 is part of a control system 29 which also includes a computer 31 that can be used by the machine tool operator to input commands to the machine tool, and receive information from the machine tool. Although the computer 31, as shown in FIG. 1, is a desktop computer, this element of the system 10 may be in the form of a control panel or other such device capable of providing information to the machine tool 11. As shown in FIG. 1, another computer 33 is also connected to the processing unit 22. The computer 33 may be connected to the processing unit 22 at some far removed distance from the machine tool 11. In fact, it is contemplated that the computer 33 may be located off-site from the machine tool 11, and connected to the processing unit 22 through an intranet or through the internet. Although the computer 33 is shown in FIG. 1 as a single notebook computer, it is contemplated that the processing unit 22 may be connected to a broader network, such that many output devices, like the computer 33, could simultaneously access information from the processing unit 22.

As noted above, the PLC 28 may be programmed with information regarding particular non-machining cycles outside an operation cycle to determine the health of spindle 14 and the slides 13, 15, 17, 19, 21. The PLC 28 is configured to output to the processing unit 22 signals related to the machine operations. For example, if the spindle 14 is instructed to rotate at different speeds, the PLC 28 can, among other things, output signals to the processing unit 22 delineating different portions of the cycle. The cycle may include the spindle 14 accelerating to a particular speed, rotating at a particular speed and decelerating from a particular speed. The PLC 28 can provide a signal whenever the speed event starts or finishes. As explained below, this allows vibration signals from the sensor 20 to be associated with particular spindle speed events.

The PLC 28 may send a tool pickup signal each time a different tool is used in a set of machining operations. The PLC 28 may also send signals indicating when a particular cutting tool, such as the cutting tool 16, is performing a particular machining operation. In addition, the PLC 28 may communicate to the processing unit 22 when the machine tool 11 is idling, and may further communicate time related data such as the number of machining cycles performed or the number of the workpiece being machined. Thus, by outputting signals related to the machining and non-machining operations, the PLC 28 may communicate to the processing unit 22 tool-specific data, idling data, machining and non-machining data, and time related data, just to name a few. Of course, the specific information output from the PLC 28 to the processing unit 22 may vary, depending on the type and quantity of information desired.

As noted above, the computer 31 provides a mechanism for an operator of the machine tool 11 to input commands to operate the machine tool 11, including commands that are in the form of a predetermined computer program which may reside on the computer 31, or in a storage location accessible by the computer 31. In addition to programs which operate the machine tool 11 to perform machining operations on a workpiece, such as the workpiece 18, non-machining programs may also be executed by the computer 31 to operate the machine tool 11. These non-machining programs may be used, for example, for purposes of gathering data to monitor the health of the machine tool 11. Thus, the computer 31 may execute a predetermined program which controls operation of the machine tool 11 to effect movement of at least a portion of the machine tool 11—e.g., the spindle 14 or one of the slides 13, 15, 17, 19, 21—so that data can be gathered and analyzed as an indicator of the health of the machine tool 11 at the component level.

Figure 2:
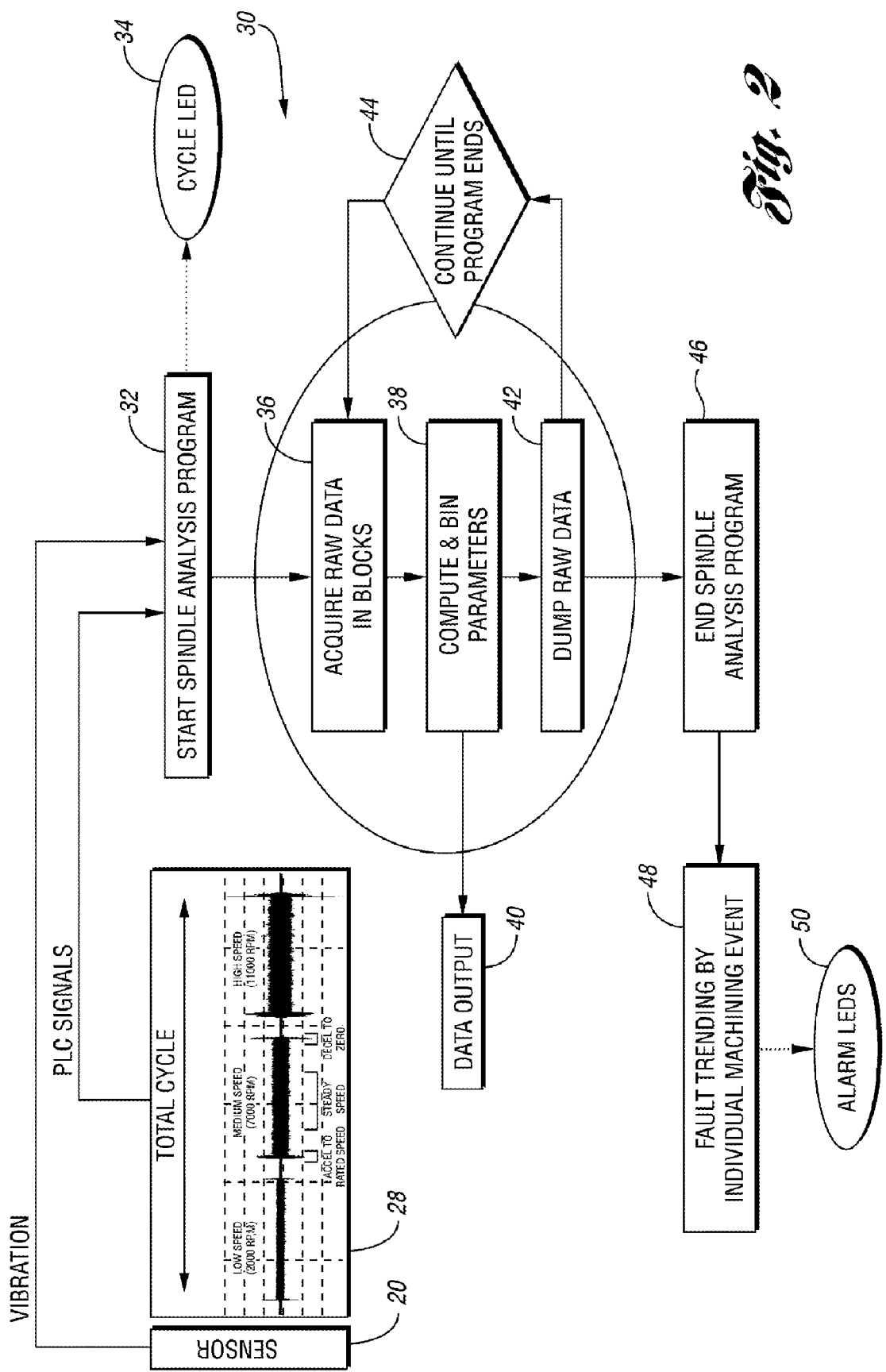
FIG. 2 is a flowchart illustrating an embodiment of a method of the present invention.

FIG. 2 shows a flowchart 30 illustrating one embodiment of a method in accordance with the present invention. At block 32, a spindle analysis program is started. This predetermined program may be loaded directly onto the computer 31, or may be accessed by the computer 31 over a remote network. As shown in FIG. 2, the sensor 20 and the PLC 28 both provide signals which are used in the subsequent data collection. The start of the spindle analysis program at block 32 can be indicated by an audible or visual indicator, such as cycle LED 34, which may be conveniently integrated into the processing unit 22.

Although the spindle analysis program indicated at block 32 may take on a number of different forms depending on the data that is desired, one effective spindle analysis program is given as an example here. At the start of the spindle analysis program, the spindle 14 is not moving. It can then be ramped up to a first predetermined speed, where it is held in a steady state condition at the first predetermined speed for some predetermined amount of time. It has been found that 30 seconds is a convenient time to use, providing enough information about the spindle movement, without using too much machine time. Of course, other time intervals may be used, as desired.

Once the spindle 14 has been operated at the first predetermined speed for the first predetermined amount of time, it is ramped down until it stops. It is worth noting that the spindle 14 does not need to start at a zero speed, nor finish at a zero speed, though these are convenient starting and ending points for purposes of delineating various operating conditions. The operation of the spindle 14 as discussed above, provides a vibration profile that includes an acceleration portion, a steady speed portion, and a deceleration portion. Signals output from the PLC 28 can be associated with the vibration data gathered from the sensor 20 so that movement-specific data profiles can be defined.

Returning to FIG. 2, raw data from the sensor 20 and the PLC 28 is acquired at block 36. This data is then associated to define a movement-specific data profile for the movement of the spindle 14. At block 38, an algorithm is applied to the raw data to generate a parametric representation of the vibration data, which is then output at block 40. As noted above, the vibration data is associated with information from the PLC 28 to define movement-specific data profiles for the data gathered. Thus, when the parametric representation of the raw data is computed at block 38, the algorithm can be used to generate one or more movement-specific data points, which can later be used to generate one or more movement-specific trend lines. As discussed more fully below, these trend lines provide a convenient method to analyze the health of the machine tool 11.

The parametric representation of the raw data helps to significantly reduce the size of the data being transferred and stored. The algorithm can be programmed to calculate any of a number of different parametric representations of the raw data. For example, the algorithm may calculate a maximum, a minimum, an average, an average root mean square (RMS), a maximum RMS, a minimum RMS, and an RMS summation. Similarly, the algorithm can be programmed to calculate a kurtosis, a kurtosis average, a kurtosis maximum, a kurtosis minimum, and a kurtosis standard deviation. Like the RMS values, the kurtosis values a readily calculated using known statistical formulas, which can be programmed into the algorithm.

At step 42, the raw data is dumped, thereby conserving storage space and bandwidth as the data is transferred. As shown in block 44, the method loops back to block 36 until the spindle analysis program is complete. The spindle analysis program being described herein for exemplary purposes, includes two additional operations of the spindle 14. In particular, the spindle 14 is again accelerated from zero, but this time it is accelerated to a second predetermined speed, where it is held at steady state for a second predetermined amount of time. It is worth noting that the second predetermined amount of time may be different from the first predetermined amount of time, or it may be the same, for example, 30 seconds. After the second predetermined period of time has elapsed, the spindle 14 is decelerated to zero. The data is then processed as shown in blocks 36-42, and at block 44, the method loops back to block 36 to acquire more data.

In the exemplary method described herein, the spindle analysis program includes a third operation of the spindle 14, during which it is accelerated from zero to a third predetermined speed, maintained at that speed for a third predetermined amount of time, and then decelerated to zero. Again, the third predetermined amount of time may be the same or different from the first and second predetermined amounts of time. Operating the spindle 14 at three different speeds, including accelerations and decelerations, may provide evidence of component wear that might not otherwise be detected if the spindle 14 was operated only at a single speed. At block 46, the spindle analysis program ends, and information is collected at block 48, where the movement-specific data points can be collected into a movement-specific trend line, which can then be used to analyze the health of the spindle 14. As described below, an alarm condition can be applied to a trend line, and an indicator provided, such as shown at block 50, to alert an operator that an alarm condition has been reached.

Figure 3:
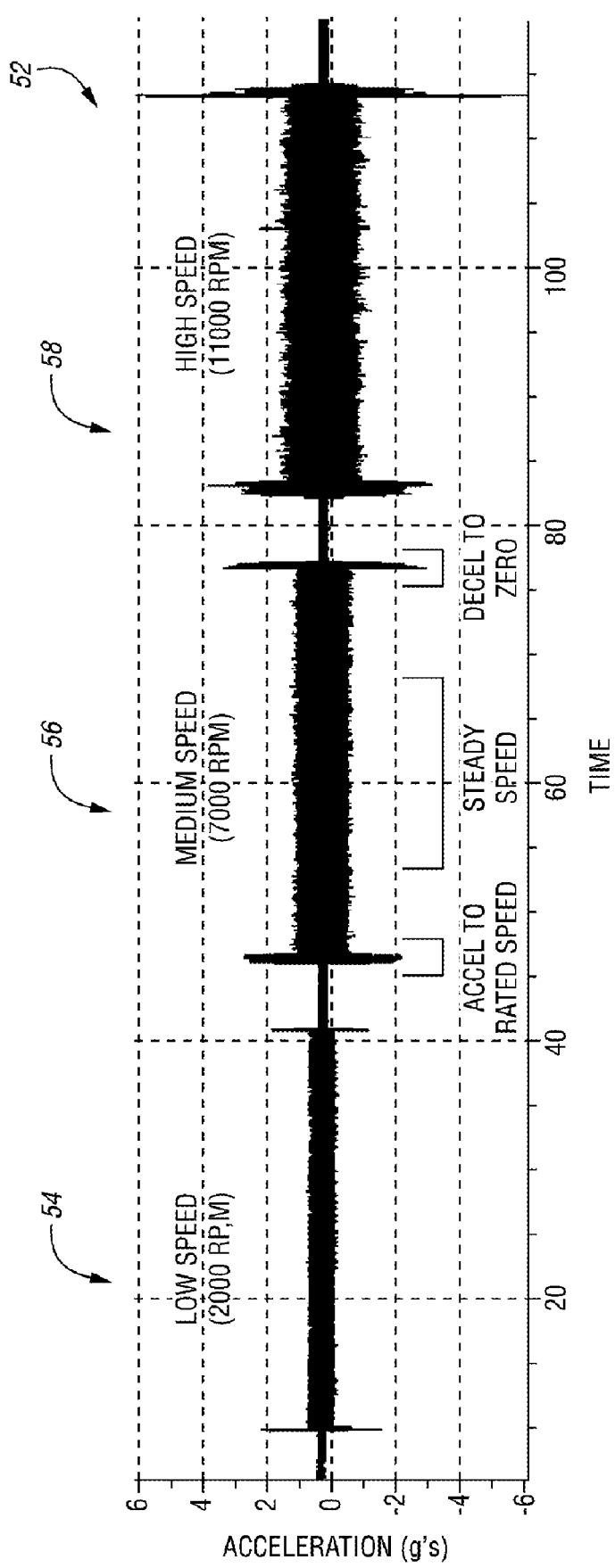
FIG. 3 shows raw vibration data collected from a machine tool during operation of a spindle at three different speeds.

FIG. 3 shows an example of movement-specific data profiles for the spindle analysis program illustrated in FIG. 2. The graph 52, shown in FIG. 3, includes three separate spindle data profiles 54, 56, 58, for three different speeds of operation of the spindle 14 during the execution of the spindle analysis program. As shown in FIG. 3, and specifically labeled for the second spindle profile 56, each profile includes an acceleration portion, a steady speed portion, and a deceleration portion. The graph 52 represents the movement-specific data profiles defined from signals received from the sensor 20 and the PLC 28 during execution of the spindle analysis program.

Therefore, the ordinate of the graph 52 represents acceleration, while the abscissa represents a time of operation.

As discussed above, application of an algorithm programmed into the processing unit 22 provides a convenient means for reducing the amount of data gathered from the sensor 20. For example, if the algorithm is applied to the data shown in the graph 52 in FIG. 3, one or more movement-specific data points can be generated, depending on how the algorithm is applied. For example, the algorithm could be applied to an entire spindle data profile, such as the profiles 54, 56, 58. Alternatively, the algorithm could be applied only to the acceleration portion, the steady speed portion, or the deceleration portion of any or all of the spindle data profiles 54, 56, 58. Once these movement-specific data points are generated, they can be combined with data points gathered at different times when the spindle analysis program is run on the machine 11. In this way, a trend line can be plotted to provide information to a manufacturing manager.

Figure 4:
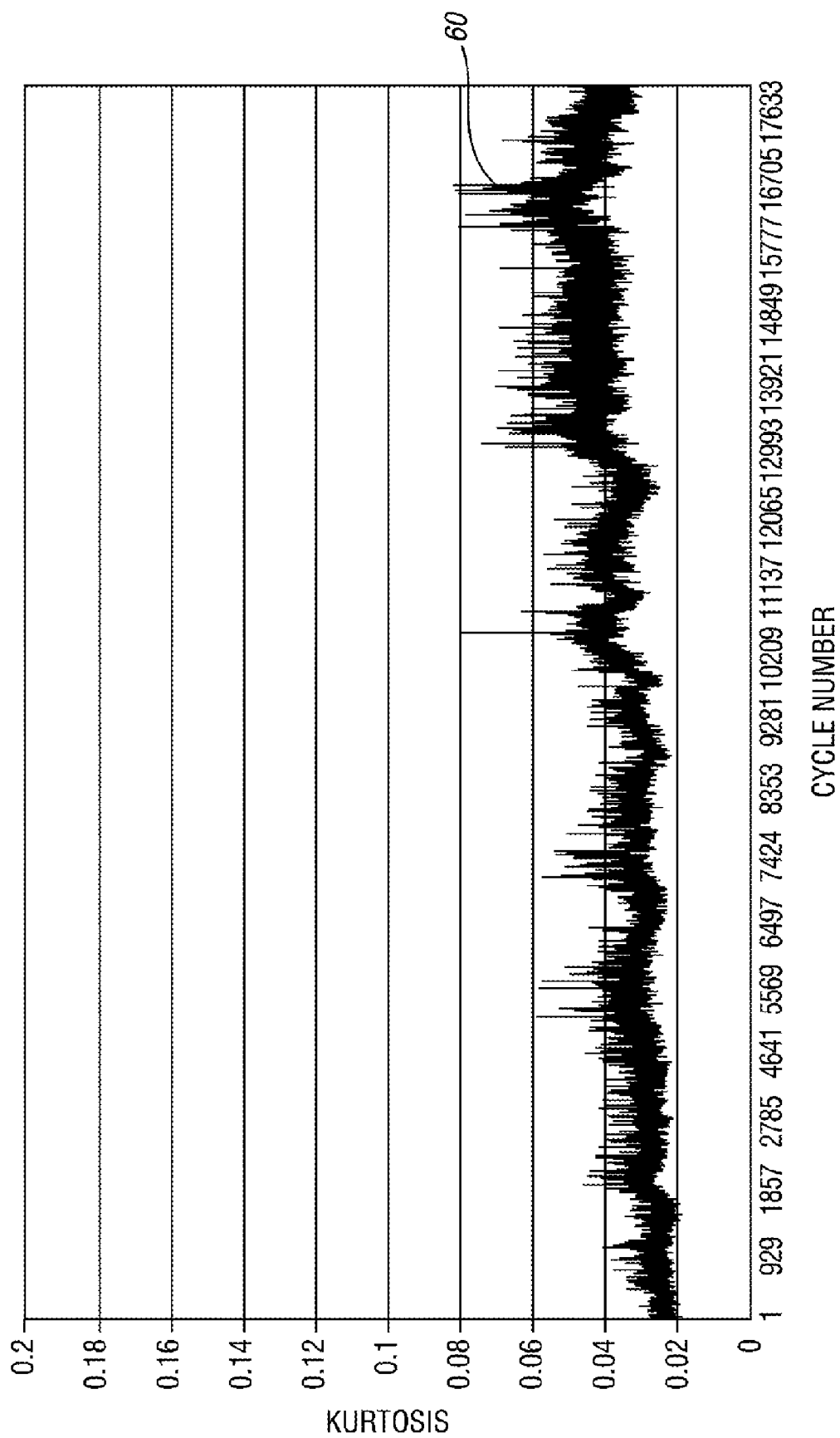
FIG. 4 shows a trend line of a parametric representation of vibration data gathered from a machine tool.

FIG. 4 shows an example of a movement-specific trend line 60, wherein the parametric representation of the vibration data is a kurtosis, which is shown along the ordinate. Along the abscissa is the cycle number that was performed on the machine tool 11. As used herein, the cycle number represents the cycle of the spindle analysis program, not a machining cycle. It is worth noting that the abscissa could also be a time value, or alternatively, could be transformed into a frequency domain. The movement-specific trend line 60, shown in FIG. 4, is indicative of a trend line that may be generated from running the spindle analysis program shown in FIG. 2.

Figure 5:
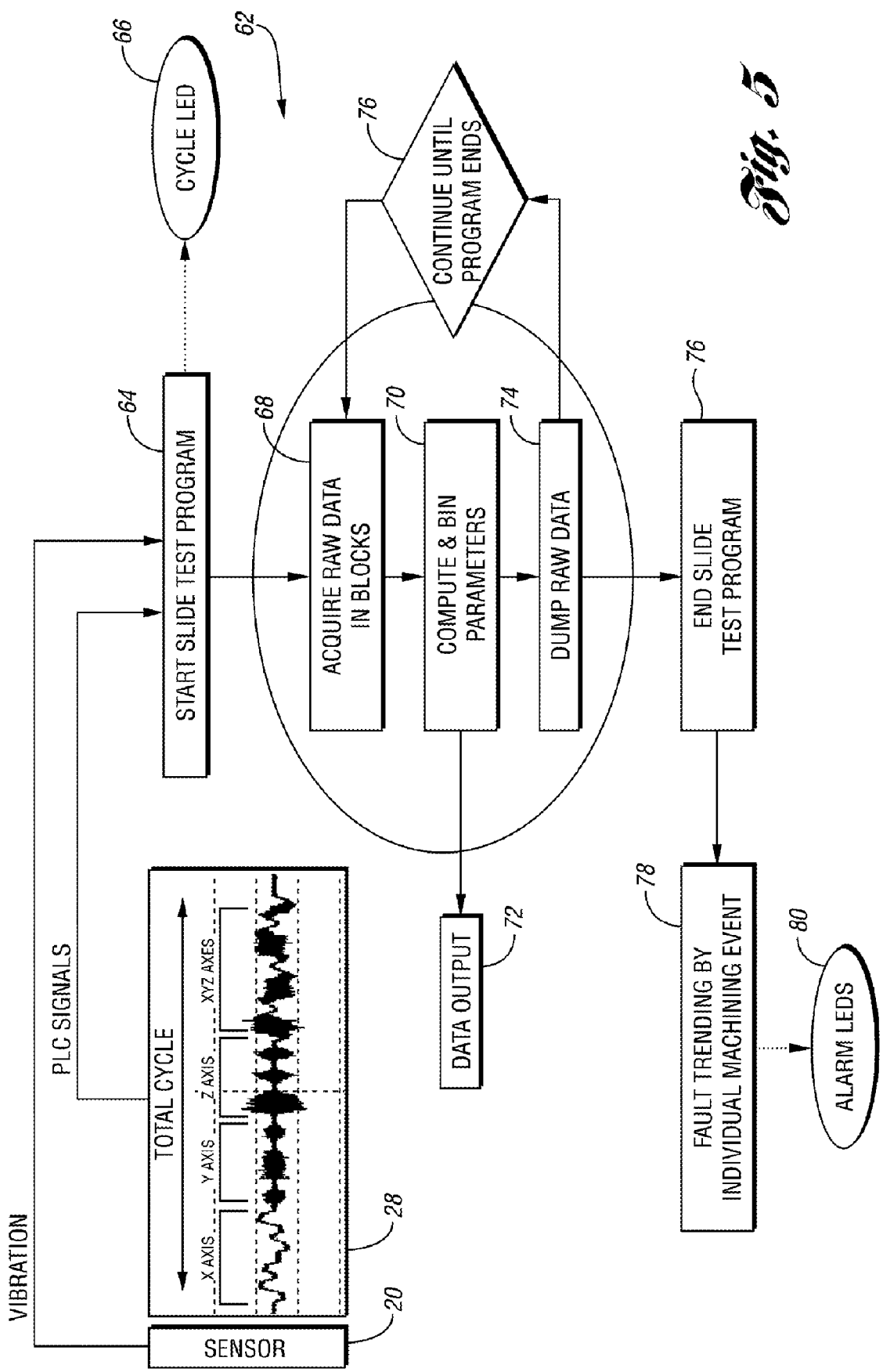
FIG. 5 is a flowchart illustrating another embodiment of a method of the present invention.

In addition to monitoring the operation of the spindle 14, the present invention also contemplates monitoring operation of the slides 13, 15, 17, 19, 21. FIG. 5 shows a flowchart 62 illustrating an embodiment of the present invention, in which the spindle slides 13, 15, 17 are tested. The slide test program can be used in conjunction with the spindle analysis program, or on its own. At block 64, the slide test program is started. Again, both the sensor 20 and the PLC 28 provide signals which are used in the subsequent data collection. The start of the slide test program at block 64 is indicated by the cycle LED 66.

As shown in FIG. 1, the machine tool 11 includes three separate spindle slides 13, 15, 17. Although the method illustrated in FIG. 5 includes testing all three of these slides, separately and in combination, it is worth noting that a slide test program contemplated by the present invention does not need to test all three slides 13, 15, 17, either alone or in combination. Moreover, the slide test program can also be applied to the machine bed slides 19, 21.

Initially, the x-axis slide 13 is operated and the raw data gathered at block 68. It may be convenient to operate the slide 13 at a rapid rate, and over a long range, of travel. It is worth noting, however, that different rates and lengths of travel can be used. At block 70, the raw data information received from the sensor 20 and the PLC 28 has the algorithm applied to it, and the parametric representation of the data is output at block 72. The raw data is dumped at block 74 to conserve space and bandwidth, and at block 76, the program loops around back to block 68.

Next, the y-axis slide 15 is operated, and when the program loops back to block 68, the z-axis slide 17 is operated. Information from each of these three slide movements is then gathered. Finally, all three slides 13, 15, 17 are operated simultaneously, and the slide test program is ended at block 76. The fault trending based on the movement-specific data points generated by application of the algorithm to the raw data occurs at block 78, and, as necessary, the alarm LED 80 is lit. It is worth noting that the slide test program not only provides information about a particular slide as that slide moves, but also provides information on the cross-transmissivity between slides. For example, movement of the y-axis slide 15 may cause a vibration in the x-axis slide 13 which is detected by the sensor 20. The effect on the slide 13 of movement of the slide 15, is an indicator of the cross-transmissivity between the x- and y-axis slides 13, 15.

FIGS. 6 and 7 show movement-specific data profiles, and in particular, slide data profiles, generated by execution of the slide test program at two different times. The graph 82, shown in FIG. 6, includes four separate movement-specific data profiles, 84, 86, 88, 90. The graph 92, shown in FIG. 7, also has four separate movement-specific data profiles, although the separate labels have been removed for clarity. The data profiles shown in FIGS. 6 and 7 can be directly compared to one another to illustrate differences in the machine tool 11 at the two different times that the slide test program was run. For example, it is clear from a comparison of the z-axis data profiles in FIGS. 6 and 7, that the z-axis slide 17 is experiencing a problem during execution of the slide test program as shown in FIG. 7. Although this is indicative from the raw data shown in FIGS. 6 and 7, as noted above, it may be more convenient to use a parametric representation of the vibration data, rather than the raw data itself.

To generate a movement-specific trend line, such as the trend line 60 shown in FIG. 4, the slide test program can be run at multiple times, to generate a number of different movement-specific data profiles, such as the profiles shown in FIGS. 6 and 7. Then, the algorithm can be applied to one of the slide data profiles, such as the profile 84 shown in FIG. 6, to generate a single movement-specific data point. Application of the algorithm to other x-axis slide data profiles will yield additional movement-specific data points, indicative of the movement of the x-axis slide 13. Each of these x-axis slide data points can then be plotted in a movement-specific trend line, such as the trend line 60 shown in FIG. 4.

As noted in FIG. 2, an alarm indicator may be provided to alert an operator or manager of a problem with the machine tool 11. The alarm can be applied to a trend line, such as the trend line 60 shown in FIG. 4. As shown in FIG. 4, the trend line 60 is generally increasing over time. This may be an indication that certain components of the machine tool 11 are becoming worn. An alarm could then be applied to the trend line 60 as an upper limit, so that if the trend line 60 exceeded the alarm condition the indicator would provide notice. The alarm condition could be set so that a single data point exceeding the alarm condition would set off the indicator. Alternatively, the alarm condition could be set such that it would take a number of data points, or a number of concurrent data points, exceeding the alarm condition to set off the indicator. In the case of the z-axis data profile shown in FIG. 7, application of the algorithm would likely yield a data point well above a median value for the trend line, and an alarm condition would be indicated.

While the best mode for carrying out the invention has been described in detail, those familiar with the art to which this invention relates will recognize various alternative designs and embodiments for practicing the invention as defined by the following claims.

What is claimed is:

1. A method for monitoring health of a machine tool operable to perform at least one operation cycle including at least one machining operation on a workpiece, the machine tool including a spindle configured to hold a cutting tool and first, second and third slides, each of the slides being operable to effect a linear movement of a portion of the machine tool in a direction different from the direction of movement effected by the other slides, the machine tool having at least one sensor operatively connected thereto for sensing a machine operation parameter, and a controller configured to output data related to operation of the machine tool, the method comprising:

operating the machine tool outside an operation cycle to effect movement of a portion of the machine tool, including:
operating the first, second and third slides separately, and operating the three slides simultaneously, and
operating the spindle in a first manner, including accelerating the spindle until it reaches a first spindle speed, operating the spindle at the first spindle speed for a first predetermined time, and decelerating the spindle;
processing data from signals output from the at least one sensor and from the controller to define movement-specific data profiles including:
first, second and third slide data profiles and a combination slide data profile, and
a first spindle data profile having an acceleration portion, a steady speed portion, and a deceleration portion corresponding to the respective movements of the spindle as it is operated in the first manner; and
applying an algorithm to:
the first, second, third and combination slide data profiles to generate four corresponding movement-specific data points, thereby facilitating generation of four corresponding movement-specific trend lines, and analysis of cross-transmissivity between the slides, and
at least one of (a) the entire first spindle data profile to generate a single movement-specific data point for the entire first spindle data profile, or (b) the acceleration portion, the steady speed portion, and the deceleration portion of the first spindle data profile to generate three corresponding movement-specific data points, thereby facilitating generation of at least one additional movement-specific trend line.

2. The method of claim 1, wherein operating the machine tool further includes, operating the spindle in a second manner, including accelerating the spindle until it reaches a second spindle speed, operating the spindle at the second spindle speed for a second predetermined time, and decelerating the spindle, and
wherein the movement-specific data profiles further include a second spindle data profile having an acceleration portion, a steady speed portion, and a deceleration portion corresponding to the respective movements of the spindle as it is operated in the second manner.

3. The method of claim 1, further comprising:
plotting at least some of the movement-specific data points to create at least one movement-specific trend line; and
applying another algorithm to the at least one movement-specific trend line to indicate an alarm condition to an operator of the machine tool.

4. The method of claim 1, wherein sensing a machine operation parameter for the machine tool includes sensing at least one of vibrations, current, temperature, torque or speed for the machine tool.

* * * * *

UNITED STATES PATENT AND TRADEMARK OFFICE
CERTIFICATE OF CORRECTION

PATENT NO.         : 7,571,022 B2                                Page 1 of 1
APPLICATION NO.    : 11/161417
DATED              : August 4, 2009
INVENTOR(S)        : Jalluri et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this

Seventh Day of September, 2010

David J. Kappos
*Director of the United States Patent and Trademark Office*